Figure 1:
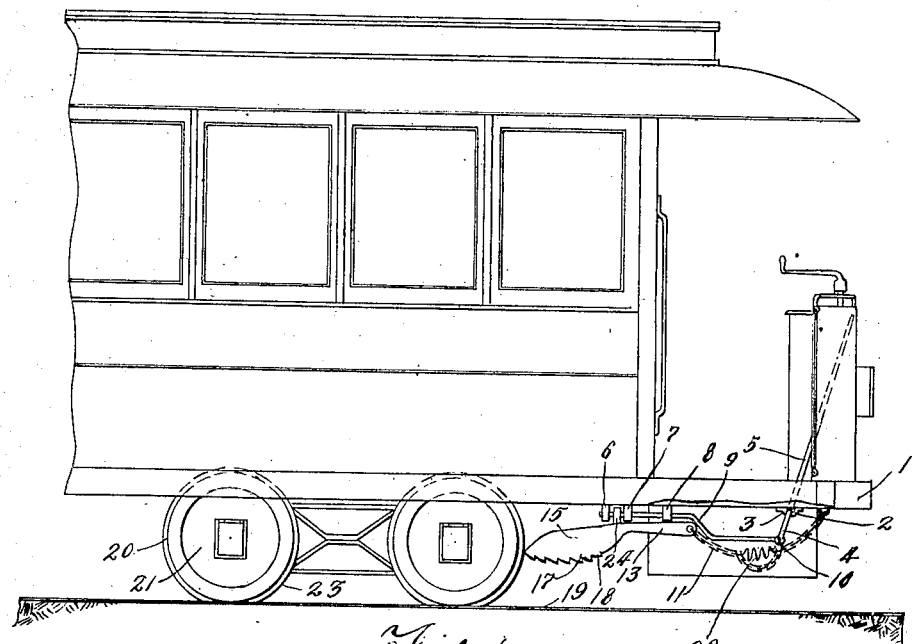

J. HAUSER.
EMERGENCY BRAKE FOR STREET CARS.
APPLICATION FILED MAR. 30, 1909.

925,904.

Patented June 22, 1909.

Inventor
J. Hauser

UNITED STATES PATENT OFFICE.

JACOB HAUSER, OF SCOTTDALE, PENNSYLVANIA.

EMERGENCY-BRAKE FOR STREET-CARS.

No. 925,904.  Specification of Letters Patent.  Patented June 22, 1909.

Application filed March 30, 1909. Serial No. 486,721.

*To all whom it may concern:*

Be it known that I, JACOB HAUSER, a citizen of the United States of America, residing at Scottdale, in the county of Westmoreland and State of Pennsylvania, have invented certain new and useful Improvements in Emergency-Brakes for Street-Cars, of which the following is a specification, reference being had therein to the accompanying drawing.

This invention relates to emergency brakes for street cars, and the objects of my invention are, first, to provide a novel brake shoe that can be easily and quickly dropped into position to retard and eventually stop the descent or forward movement of a car; second, to provide a brake mechanism easily operated by the motorman of a car to prevent a car from running away when descending an inclination; and third, to provide a simple and inexpensive brake mechanism that will be positive in its action and highly efficient for stopping a car after the motorman has lost control of the electric or hand brakes of the car.

The above objects are obtained by an emergency brake that will be hereinafter described in detail and then specifically pointed out in the appended claims, and reference will now be had to the drawing forming a part of this application wherein there is illustrated the preferred embodiments of my invention, but I would have it understood that the detail construction thereof can be varied or changed without departing from the spirit of the invention.

Figure 2:
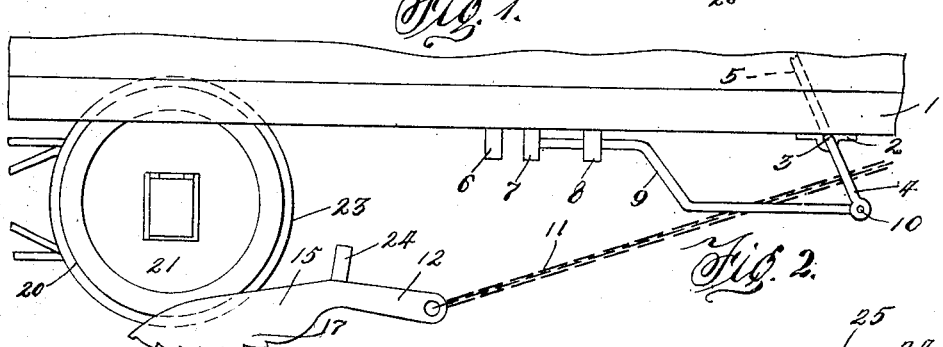
Figure 3:
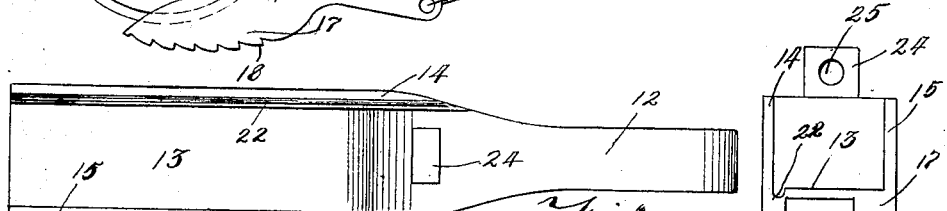
Figure 5:
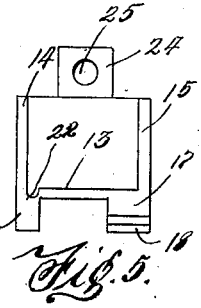
Figure 4:
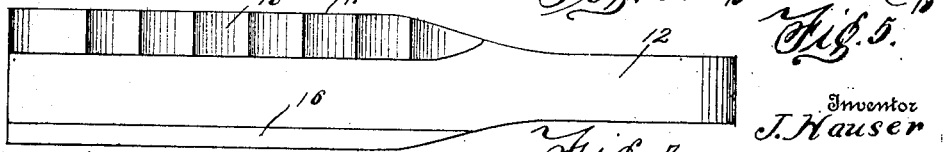

Referring to the drawings:—Figure 1 is an elevation of a portion of a street car equipped with the emergency brake, illustrating the brake in an inactive position, Fig. 2 is an enlarged elevation of a portion of a car illustrating the brake shoe in an active position, Fig. 3 is an enlarged plan of the brake shoe, Fig. 4 is an enlarged bottom plan of the same, and Fig. 5 is an end view of the brake shoe.

To put my invention into practice, I provide the platform 1 of a car with hangers 2 for a shaft 3 having a crank 4 at one end thereof, while the opposite end is provided with a lever 5 extending upwardly through the platform 1 to an elevation convenient to the motorman or operator of the car. The platform 1 of the car is also provided with depending brackets 6, 7 and 8 having longitudinally alining openings for a rod 9, which is loosely connected, as at 10, to the crank 4 of the shaft 3.

Attached to the platform 1 by a chain 11 is a brake shoe 12 comprising a tread plate 13, upright longitudinal side flanges 14 and 15, a depending longitudinal rail engaging flange 16 and a depending longitudinal gripping flange 17, said flange having serrations or teeth 18 for engaging the ground or pavement adjacent to the rail 19 upon which the car is traveling. The tread plate 13 receives the tread 20 of a car wheel 21 and is provided with a longitudinal groove 22 for the flange 23 of said wheel. The shoe intermediate the ends thereof, preferably adjacent to the attached end of the shoe is provided with a vertical lug 24 having an opening 25 formed therein.

With the shoe in an inactive position as shown in Fig. 1 of the drawings, the lug 24 is held between the depending brackets 6 and 7 by a rod 9 and to take up the slack in the chain 11, two of the links of said chain are connected by a spring 26. The tension of the spring 26 is adjusted sufficient to support the slack portion of the chain, but the weight of the shoe 12 is sufficient when said shoe is released to either break the spring or expand the same, whereby the car wheel 21 can ride upon the shoe 12. When the shoe 12 is dropped and engaged by the wheel 21, the wheel will have a tendency to snap the chain 11, but by using the spring 26, the shoe 12 will gradually yield to the action of the wheel 21 and prevent the chain 11 from being injured.

The flange 16 of the shoe 12 is adapted to engage the inner side of the rail 19 and maintain the shoe upon said rail, while the depending serrated or toothed flange 17 engages the pavement or ground adjacent to the rail and retards the movement of the car. The brake shoe can be used in connection with each wheel, and the actuating mechanism located to be quickly operated by the motorman of the car should the ordinary brakes fail to act. Each shoe is constructed of strong and durable metal and made of a size according to the wheel in connection with which the same is to be used.

Having now described my invention what I claim as new, is:—

1. In an emergency brake, for street cars, the combination of a brake shoe, means for detachably suspending said shoe in an inactive position from the street car, said means including a longitudinally movable rod, a crank shaft carried by the car and connecting at one end to said rod, a lever connected to said shaft for operating the same, a chain connecting the forward end of said brake shoe with said car, said brake shoe comprising a tread plate, longitudinal side flanges carried by said tread plate, longitudinal depending flanges carried by said tread plate, one of said flanges being serrated, and said tread plate having a longitudinal groove formed therein for the flange of a car wheel.

2. An emergency brake shoe for cars, comprising a tread plate having longitudinal upright side flanges, longitudinal depending flanges, one of said flanges being serrated, and said tread plate having a longitudinal groove formed therein for the flange of the car wheel.

In testimony whereof I affix my signature in the presence of two witnesses.

JACOB HAUSER.

Witnesses:
F. J. DICKERHOFF,
C. B. STRICKLER.